US010404956B2

(12) United States Patent
Ito et al.

(10) Patent No.: US 10,404,956 B2
(45) Date of Patent: Sep. 3, 2019

(54) HEAD-UP DISPLAY EMITTING LIGHT OF DIFFERENT COLORS FROM A PLURALITY OF LIGHT SOURCES, AND LIGHT SOURCE CONTROL METHOD THEREOF (71) Applicant: FUJIFILM Corporation, Tokyo (JP)

(72) Inventors: Daisuke Ito, Saitama (JP); Koudai Fujita, Saitama (JP); Kenji Ito, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/622,047

(22) Filed: Jun. 13, 2017

(65) Prior Publication Data
US 2017/0280094 A1 Sep. 28, 2017

Related U.S. Application Data (63) Continuation of application No. PCT/JP2015/081621, filed on Nov. 10, 2015.

(30) Foreign Application Priority Data

Dec. 24, 2014 (JP) ................................ 2014-260512

(51) Int. Cl.
*H04N 9/31* (2006.01)
*G03B 21/14* (2006.01)
(Continued)

(52) U.S. Cl.
CPC ........... *H04N 9/3155* (2013.01); *G03B 21/14* (2013.01); *G03B 21/2053* (2013.01); *H04N 9/31* (2013.01);
(Continued)

(58) Field of Classification Search
CPC .. H04N 9/3144; H04N 9/3182; H04N 9/3155; H04N 9/3158; H04N 9/3102;
(Continued)

(56) References Cited

U.S. PATENT DOCUMENTS 7,057,811 B2 *  6/2006  Bruegl .................. G02B 27/01
                                               345/47
7,273,286 B2 *  9/2007  Ikebe ..................... G03B 21/16
                                               315/312
(Continued)

FOREIGN PATENT DOCUMENTS

CN     101253776      8/2008
CN     101750856      6/2010
(Continued)

OTHER PUBLICATIONS

"Written Opinion of the International Searching Authority (Form PCT/ISA/237) of of PCT/JP2015/081621", dated Feb. 9, 2016, with English translation thereof, pp. 1-10.
(Continued)

*Primary Examiner* — Bao-Luan Q Le
(74) *Attorney, Agent, or Firm* — JCIPRNET (57) ABSTRACT A projection display device and a light source control method thereof capable of improving visibility of specific information without increasing a manufacturing cost and a power consumption amount are provided. An HUD includes a plurality of light sources that emit light beams with different colors, a projection unit that projects light according to image information among the light beams emitted from the plurality of light sources onto a combiner, and a light source control unit that sequentially emits lights from the plurality of respective light sources according to a predetermined light emission amount pattern. The light source control unit performs control for causing at least one of the light sources other than a specific light source among the plurality of light sources to emit light with a smaller light emission amount than a light emission amount of the specific light.

14 Claims, 4 Drawing Sheets (51) Int. Cl.
*G03B 21/20* (2006.01)
*G09G 3/20* (2006.01)
*G09G 3/34* (2006.01)
*G09G 3/36* (2006.01)
*G03B 33/08* (2006.01)
*G09G 3/00* (2006.01)

(52) U.S. Cl.
CPC ......... *H04N 9/3164* (2013.01); *H04N 9/3194* (2013.01); *G03B 33/08* (2013.01); *G09G 3/001* (2013.01); *G09G 3/20* (2013.01); *G09G 3/34* (2013.01); *G09G 3/3413* (2013.01); *G09G 3/36* (2013.01); *G09G 2310/0235* (2013.01); *G09G 2320/041* (2013.01); *G09G 2360/144* (2013.01); *G09G 2380/10* (2013.01); *H04N 9/3102* (2013.01); *H04N 9/3105* (2013.01)

(58) Field of Classification Search
CPC .. H04N 9/3105; H04N 9/3111; H04N 9/3123; H04N 9/3161; H04N 9/3164; G03B 21/16; G03B 21/2053
See application file for complete search history.

(56) References Cited

U.S. PATENT DOCUMENTS

| | | | |
|---|---|---|---|
| 7,795,822 B2* | 9/2010 | Arai | G09G 3/3426 315/291 |
| 7,873,087 B2* | 1/2011 | Morikawa | H04N 9/3161 372/29.015 |
| 8,021,001 B2 | 9/2011 | Iwanaga | |
| 8,087,787 B2* | 1/2012 | Medin | G03B 21/16 353/52 |
| 8,342,694 B2 | 1/2013 | Shibasaki | |
| 8,465,159 B2 | 6/2013 | Iwanaga | |
| 8,585,213 B2 | 11/2013 | Plut | |
| 9,022,578 B2* | 5/2015 | Nakanishi | G03B 21/16 348/747 |
| 9,046,753 B2* | 6/2015 | Takamatsu | G03B 21/2033 |
| 9,052,576 B2 | 6/2015 | Shibasaki et al. | |
| 2005/0174635 A1* | 8/2005 | Bruegl | G02B 27/01 359/443 |
| 2005/0275809 A1* | 12/2005 | Ikebe | G03B 21/16 353/52 |
| 2006/0120084 A1* | 6/2006 | Sueoka | G03B 21/16 362/294 |
| 2006/0215124 A1* | 9/2006 | Seo | G03B 21/16 353/52 |
| 2007/0070296 A1 | 3/2007 | Iwanaga | |
| 2008/0042578 A1* | 2/2008 | Arai | G09G 3/3426 315/32 |
| 2009/0274182 A1* | 11/2009 | Morikawa | H01S 5/0683 372/29.015 |
| 2010/0060861 A1* | 3/2010 | Medin | G03B 21/16 353/57 |
| 2010/0128226 A1 | 5/2010 | Shibasaki | |
| 2011/0080927 A1* | 4/2011 | Morikawa | H01S 5/0683 372/38.01 |
| 2011/0242496 A1* | 10/2011 | Kimoto | G03B 21/16 353/31 |
| 2011/0292098 A1 | 12/2011 | Iwanaga | |
| 2012/0170004 A1* | 7/2012 | Park | G03B 21/16 353/31 |
| 2012/0249976 A1* | 10/2012 | Shibasaki | H04N 9/3111 353/52 |
| 2012/0327379 A1* | 12/2012 | Enomoto | G03B 21/16 353/52 |
| 2013/0063705 A1* | 3/2013 | Takamatsu | G03B 21/2033 353/31 |
| 2013/0070208 A1* | 3/2013 | Nakanishi | G03B 21/16 353/31 |
| 2013/0249963 A1 | 9/2013 | Iwanaga | |
| 2014/0028986 A1 | 1/2014 | Plut | |

FOREIGN PATENT DOCUMENTS

| | | |
|---|---|---|
| CN | 101840063 | 9/2010 |
| CN | 102450021 | 5/2012 |
| JP | 2007-094108 | 4/2007 |
| JP | 2007-212946 | 8/2007 |
| JP | 2009-031527 | 2/2009 |
| JP | 2010-152326 | 7/2010 |
| JP | 2012-003092 | 1/2012 |

OTHER PUBLICATIONS

"International Search Report (Form PCT/ISA/210) of PCT/JP2015/081621", dated Feb. 9, 2016, with English translation thereof, pp. 1-4.

"Office Action of China Counterpart Application," with English translation thereof, dated Apr. 17, 2018, p. 1-p. 18.

"Office Action of China Counterpart Application," dated Oct. 24, 2018, with English translation thereof, p. 1-p. 20.

* cited by examiner

FIG. 7

# HEAD-UP DISPLAY EMITTING LIGHT OF DIFFERENT COLORS FROM A PLURALITY OF LIGHT SOURCES, AND LIGHT SOURCE CONTROL METHOD THEREOF

CROSS-REFERENCE TO RELATED APPLICATIONS

This application is a Continuation of PCT International Application No. PCT/JP 2015/081621 filed on Nov. 10, 2015, which claims priority under 35 U.S.C § 119(a) to Japanese Patent Application No. 2014-260512 filed on Dec. 24, 2014. Each of the above application(s) is hereby expressly incorporated by reference, in its entirety, into the present application.

BACKGROUND OF THE INVENTION

1. Field of the Invention

The present invention relates to a projection display device and a light source control method thereof.

2. Description of the Related Art

A head-up display (HUD) device for a car in which a windshield of a car or a combiner arranged near the front of the windshield is used as a screen, and projection light is projected onto the screen so that an image is displayed is known (see, for example, JP2012-003092A). According to this HUD, a user can view an image that is displayed on a windshield or the like by the projection light projected from the HUD, which is superimposed on a scenery ahead of the own vehicle that is on the back side of the windshield or the like.

There is an HUD that adopts a so-called field sequential scheme (surface sequential scheme) of sequentially rapidly switching light incident on a light modulation element, such as a digital micromirror device (DMD) or a liquid crystal display element, to red light, green light, and blue light in time series, and combines afterimages corresponding to the respective color lights on a retina of a person to obtain a color image.

JP2012-003092A describes a device that projects an image using a field sequential scheme. In this device, it is possible to project a high-quality image according to ambient brightness by providing two types of light sources that emit respective color lights including a light source having a large light emission amount and a light source having a small light emission amount.

SUMMARY OF THE INVENTION

In an HUD likely to be used in a bright environment like an HUD for a car, it may be preferable to increase brightness of a displayed image to improve visibility. In particular, considering that abnormality such as malfunction is reported to a user or an emergency situation such as less gasoline is reported to a user in the case of a car, improvement of the visibility is an important challenge.

However, luminance of a projected image cannot be sufficiently increased since a maximum light emission amount of a plurality of light sources for an HUD as a single light source body has been determined.

Further, if the light emission amount of the light source is increased for high luminance of the projected image, a heat generation amount within a light source unit also increases accordingly. Further, the light emission amount may decrease with temperature rise due to such heat generation, and it is difficult to sufficiently increase the luminance of the projected image. Further, it is difficult to increase the light emission amount of the light source under an environment in which use power is limited.

In the HUD described in JP2012-003092A, since the number of light sources increases, a manufacturing cost increases. Further, in a case where the HUD is built in a dashboard of a car, miniaturization of the HUD is required, but the miniaturization cannot be handled as the number of light sources increases.

The present invention has been made in view of the above circumstances, and an object of the present invention is to improve visibility of specific information without increasing a manufacturing cost and a power consumption amount in a projection display device that performs an image display using a scheme of causing light to be emitted in a time division manner from a plurality of light sources emitting light with different colors, and a light source control method thereof.

A projection display device of the present invention comprises a plurality of light sources that emit light beams with different colors; a projection unit that projects light according to image information among the light beams emitted from the plurality of light sources onto a projection surface; a light source control unit that sets a light emission amount of each of the plurality of light sources to a predetermined light emission amount pattern, and sequentially emits lights from the plurality of light sources according to the light emission amount pattern; and a temperature detection unit that detects temperature, in which the light source control unit performs first control for causing at least one of the light sources other than a specific light source among the plurality of light sources to emit light with a smaller light emission amount than a light emission amount of the specific light source during a light emission period of the specific light source according to the light emission amount pattern, the specific light source being any one of the plurality of light sources; in which the specific light source is a light source in which a change in light emission intensity with respect to a temperature change is maximized among the plurality of light sources; in which and the light source control unit selectively performs the first control, and second control for causing the plurality of respective light sources to sequentially emit light, performs the first control in a case where the temperature detected by the temperature detection unit is equal to or higher than a threshold value, and performs the second control in a case where the temperature detected by the temperature detection unit is lower than the threshold value.

A light source control method of a projection display device of the present invention is a light source control method of a projection display device including a plurality of light sources that emit light beams with different colors, and a projection unit that projects light according to image information among the light beams emitted from the plurality of light sources onto a projection surface, the light source control method comprising: a light source control step of setting a light emission amount of each of the plurality of light sources to a predetermined light emission amount pattern, and sequentially emitting lights from the plurality of light sources according to the light emission amount pattern; and a temperature detection step of detecting temperature, in which the light source control step includes performing first control for causing at least one of the light sources other than a specific light source among the plurality of light sources to emit light with a smaller light emission amount than a light emission amount of the specific light source during a light emission period of the specific light source according to the light emission amount pattern, the specific light source being any one of the plurality of light sources; in which the specific light source is a light source in which a change in light emission intensity with respect to a temperature change is maximized among the plurality of light sources; and in which the light source control step includes selectively performing the first control and second control for causing the plurality of respective light sources to sequentially emit light, performing the first control in a case where the temperature detected in the temperature detection step is equal to or higher than a threshold value, and performing the second control in a case where the temperature detected in the temperature detection step is lower than the threshold value.

According to the present invention, it is possible to improve visibility of specific information without increasing a manufacturing cost and a power consumption amount in a projection display device that performs an image display using a scheme of causing light to be emitted in a time division manner from a plurality of light sources emitting light beams with different colors.

DESCRIPTION OF THE PREFERRED EMBODIMENTS

Hereinafter, embodiments of the present invention will be described with reference to the drawings.

Figure 1:
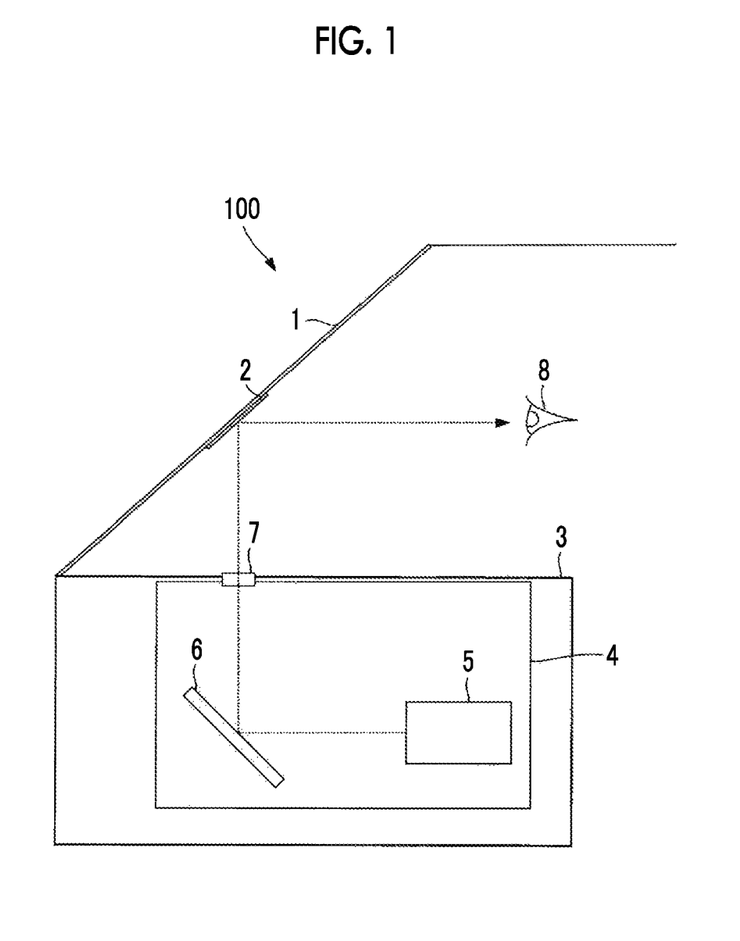
FIG. 1 is a diagram illustrating a configuration of a HUD that is an embodiment of a projection display device of the present invention.

FIG. 1 is a diagram illustrating a configuration of an HUD that is an embodiment of a projection display device of the present invention.

The HUD illustrated in FIG. 1 includes a projection unit 4 built in a dashboard 3 of a car 100, and a combiner 2 affixed to an inner surface of a windshield 1 of the car 100.

The projection unit 4 includes a display unit 5, a mirror 6 that reflects light according to image information emitted from the display unit 5, and an opening 7 that emits the light reflected by the mirror 6 to the outside.

The combiner 2 is a projection surface on which the light projected from the opening 7 is projected, and reflects this light. A driver 8 of the car 100 can view information on driving by seeing the light reflected by the combiner 2. Further, the combiner 2 has a function of reflecting the light projected from the opening 7 and transmitting light from the outside (outside world) of the windshield 1. Therefore, the driver 8 can see a sight of the outside world outside the windshield 1 together with an image based on the light projected from the opening 7.

Figure 2:
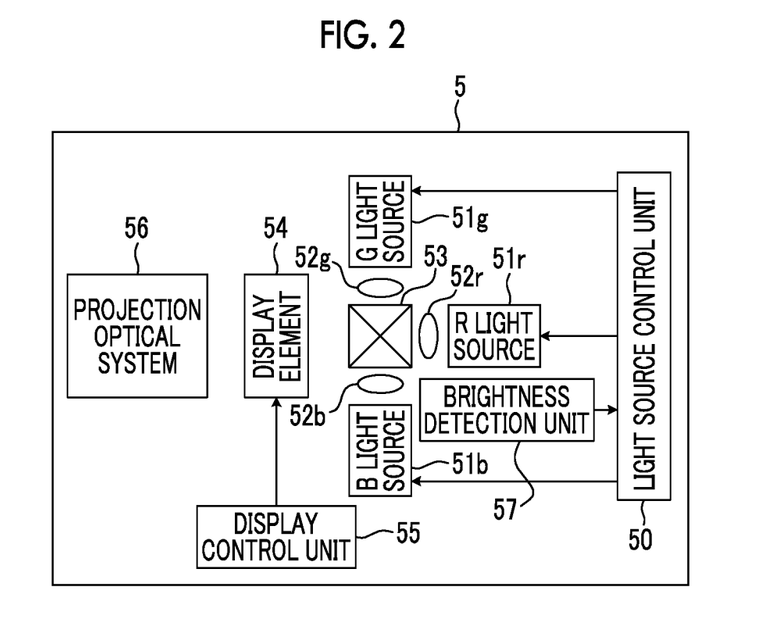
FIG. 2 is a diagram illustrating a configuration of a display unit illustrated in FIG. 1.

FIG. 2 is a diagram illustrating a configuration of the display unit 5 illustrated in FIG. 1.

The display unit 5 includes a light source control unit 50, an R light source 51r that is a red light source that emits red light (hereinafter referred to as R light), a G light source 51g that is a green light source that emits green light (hereinafter referred to as G light), a B light source 51b that is a blue light source that emits blue light (hereinafter referred to as B light), a dichroic prism 53, a collimator lens 52r provided between the R light source 51r and the dichroic prism 53, a collimator lens 52g provided between the G light source 51g and the dichroic prism 53, a collimator lens 52b provided between the B light source 51b and the dichroic prism 53, a display element 54, a display control unit 55, a projection optical system 56, and a brightness detection unit 57.

Light emitting elements such as a laser or a light emitting diode (LED) are used as the R light source 51r, the G light source 51g, and the B light source 51b. Although the HUD including three light sources including the R light source 51r, the G light source 51g, and the B light source 51b is exemplified in this embodiment, the number of light sources may be two, or four or more. That is, the HUD may include a plurality of light sources that emit light beams with different colors.

The brightness detection unit 57 detects brightness of a place where the combiner 2 is placed (the inside of the car 100 in the example of FIG. 1), and notifies the light source control unit 50 of the detected brightness. The brightness detection unit 57 includes, for example, an illuminance sensor and an illuminance information acquisition unit.

The illuminance sensor is installed, for example, near the combiner 2 or near the opening 7, detects the illuminance of the place where the combiner 2 is placed, and outputs the detected illuminance information to the illuminance information acquisition unit. The illuminance information acquisition unit is installed, for example, in the dashboard 3, acquires illuminance information detected by the illuminance sensor, and notifies the light source control unit 50 of the acquired illumination information. The light source control unit 50 detects the brightness of the place where the combiner 2 is placed on the basis of the illuminance information.

The brightness detection unit 57 may detect the brightness from year, month, date, and time without using a physical sensor such as an illuminance sensor. If year, month, date, and time are known, it is possible to determine whether it is time when the sun rises or time when the sun sets. Therefore, in a case where the brightness detection unit 57 determines that the sun rises (daytime) on the basis of year, month, date, and time, the brightness detection unit 57 notifies the light source control unit 50 that the brightness of the place where the combiner 2 is placed is equal to or higher than a threshold value TH1, as brightness information. Further, in a case where the brightness detection unit 57 determines that the sun sets (nighttime) on the basis of year, month, date, and time, the brightness detection unit 57 notifies the light source control unit 50 that the brightness of the place where the combiner 2 is placed is lower than the threshold value TH1, as brightness information.

The dichroic prism 53 is an optical member for guiding light emitted from each of the R light source 51r, the G light source 51g, and the B light source 51b to the same optical path. The optical member having such a function is not limited to the dichroic prism. For example, a cross dichroic mirror may be used.

The dichroic prism 53 transmits the R light converted into parallel light by the collimator lens 52r and emits the R light to the display element 54. Further, the dichroic prism 53 reflects the G light converted into parallel light by the collimator lens 52g and emits the G light to the display element 54. Further, the dichroic prism 53 reflects the B light converted into parallel light by the collimator lens 52b and emits the B light to the display element 54.

The light source control unit 50 selectively performs first control and second control on the basis of the brightness of the place where the combiner 2 is placed, which is notified from the brightness detection unit 57. The light source control unit 50 performs the first control in a case where the brightness of the place where the combiner 2 is placed is equal to or higher than a threshold value TH1, and performs the second control in a case where the brightness of the place where the combiner 2 is placed is lower than the threshold value TH1.

The first control is control for setting a light emission amount of each of the R light source 51r, the G light source 51g, and the B light source 51b to a predetermined light emission amount pattern (a first light emission amount pattern to be described below), causing light to be sequentially emitted from the R light source 51r, the G light source 51g, and the B light source 51b according to this light emission amount pattern, and causing light to be emitted with a smaller light emission amount than the light emission amount of the light source that is emitting light from the light sources other than the light source that is emitting light during a light emission period of each of the R light source 51r, the G light source 51g, and the B light source 51g b according to the light emission amount pattern.

The second control is control for setting the light emission amount of each of the R light source 51r, the G light source 51g, and the B light source 51b to a predetermined light emission amount pattern (a second light emission amount pattern to be described below) and causing light to be sequentially emitted from the R light source 51r, the G light source 51g, and the B light source 51b according to this light emission amount pattern.

The display element 54 emits light according to the image information to the projection optical system 56. The display element 54 includes, for example, a liquid crystal display panel in which a large number of liquid crystal display pixels without color filters are two-dimensionally arranged. In the display element 54, transmittance of each liquid crystal display pixel is controlled (modulated) according to a color component constituting each pixel of image information to be displayed, under the control of the display control unit 55.

The display control unit 55 performs R transmittance control for controlling each liquid crystal display pixel to have a transmittance according to a red color component in the image information, G transmittance control for controlling each liquid crystal display pixel to have a transmittance according to a green color component in the image information, and B transmittance control for controlling each liquid crystal display pixel to have a transmittance according to a blue color component in the image information.

The display control unit 55 performs the R transmittance control in synchronization with a period during which the light source control unit 50 causes light to be emitted from the R light source 51r. The display control unit 55 performs the G transmittance control in synchronization with a period during which the light source control unit 50 causes light to be emitted from the G light source 51g. The display control unit 55 performs the B transmittance control in synchronization with a period during which the light source control unit 50 causes light to be emitted from the B light source 51b.

The projection optical system 56 is an optical system for projecting the light according to the image information emitted from the display element 54 onto the mirror 6. The projection optical system 56 and the mirror 6 constitute a projection unit that projects the light according to the image information emitted from the display element 54 onto the combiner 2 serving as a projection surface.

Here, the configuration in which the display element 54 emits the light (red image light, green image light, and blue image light) according to the image information to the projection optical system 56 in a time division manner has been exemplified. However, the light according to the image information may be emitted to the projection optical system 56 using, for example, a Liquid Crystal on Silicon (LCOS), a Digital Mirror Device (DMD), Micro Electro Mechanical Systems (MEMS), or the like in place of the display element 54.

Figure 3:
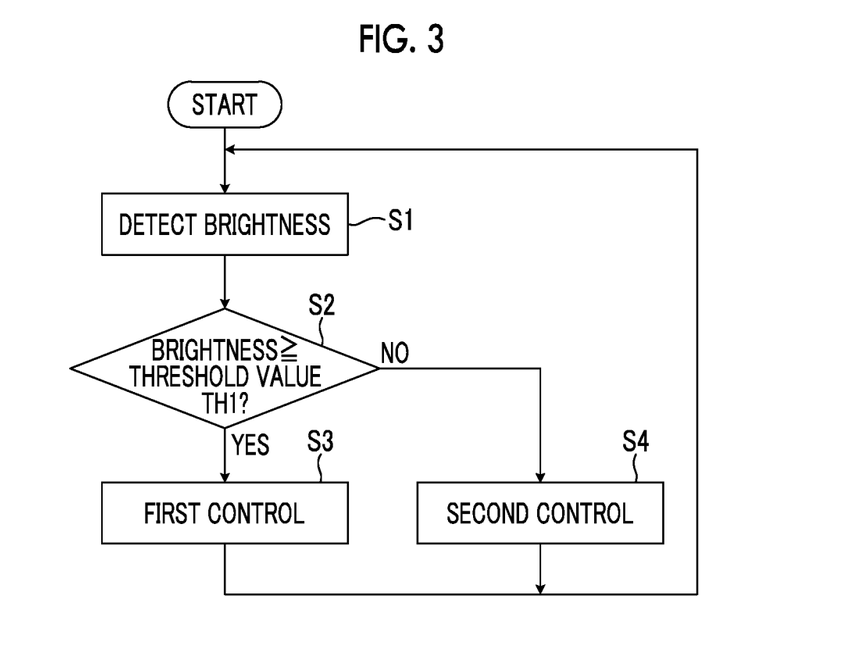
FIG. 3 is a flowchart illustrating an operation of the display unit.

FIG. 3 is a flowchart illustrating an operation of the display unit 5. In description of FIG. 3, specific processing contents will also be described with reference to FIGS. 4 and 5. The process illustrated in FIG. 3 is repeatedly executed while the HUD is powered on.

The brightness detection unit 57 of the display unit 5 detects the brightness of the place where the combiner 2 is placed and notifies the light source control unit 50 of the brightness (step S1). The light source control unit 50 determines whether or not the brightness notified from the brightness detection unit 57 is equal to or higher than the threshold value TH1 (step S2).

In a case where the light source control unit 50 determines that the brightness of the place where the combiner 2 is placed is equal to or higher than the threshold value TH1 (step S2: YES), the light source control unit 50 performs the first control (step S3).

Figure 4:
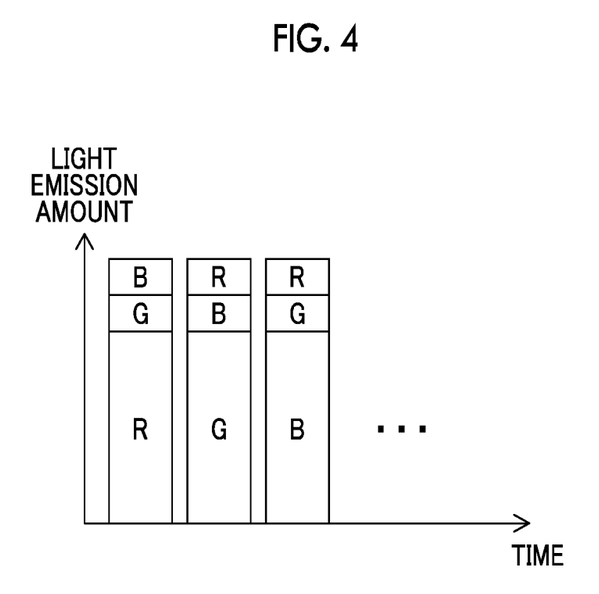
FIG. 4 is a diagram illustrating first control that is performed by a light source control unit 50.

FIG. 4 is a diagram illustrating the first control that is performed by the light source control unit 50. In FIG. 4, a vertical axis indicates a light emission amount of the light source, and a horizontal axis indicates time. A block marked with "R" indicates a period during which the R light source 51r emits light. A block marked with "G" indicates a period during which the G light source 51g emits light. A block marked with "B" indicates a period during which the B light source 51b emits light.

In the example of FIG. 4, the light source control unit 50 sets the light emission amounts of the R light source 51r, the G light source 51g, and the B light source 51b to the first light emission amount pattern in which all the light emission amounts are the same, and causes the R light source 51r, the G light source 51g, and the B light source 51b to emit light sequentially in this order according to the first light emission amount pattern. The first light emission amount pattern is an example, and is not limited to the pattern illustrated in FIG. 4.

Further, the light source control unit 50 sets the G light source 51g and the B light source 51b to a smaller light emission amount than the light emission amount of the R light source 51r during a light emission period of the R light source 51r based on the first light emission amount pattern, and causes the G light source 51g and the B light source 51b to emit light at the same time as the R light source 51r.

Similarly, the light source control unit 50 sets the R light source 51r and the B light source 51b to a smaller light emission amount than the light emission amount of the G light source 51g during a light emission period of the G light source 51g based on the first light emission amount pattern, and causes the R light source 51r and the B light source 51b to emit light at the same time as the G light source 51g.

Similarly, the light source control unit 50 sets the R light source 51r and the G light source 51g to a smaller light emission amount than the light emission amount of the B light source 51b during a light emission period of the B light source 51b based on the first light emission amount pattern, and causes the R light source 51r and the G light source 51g to emit light at the same time as the B light source 51b.

In a case where the light source control unit 50 determines that the brightness notified from the brightness detection unit 57 is lower than the threshold value TH1 (step S2: NO), the light source control unit 50 performs the second control (step S4).

Figure 5:
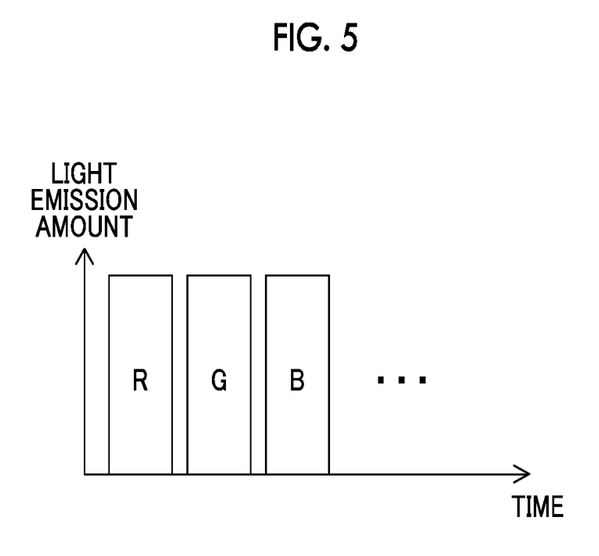
FIG. 5 is a diagram illustrating second control that is performed by the light source control unit 50.

FIG. 5 is a diagram illustrating the second control that is performed by the light source control unit 50.

In the example of FIG. 5, the light source control unit 50 sets the light emission amounts of the R light source 51r, the G light source 51g, and the B light source 51b to the second light emission amount pattern in which all the light emission amounts are the same, and causes the R light source 51r, the G light source 51g, and the B light source 51b to emit light sequentially in this order according to the second light emission amount pattern.

The second light emission amount pattern is a pattern in which the light emission amounts of the R light source 51r, the G light source 51g, and the B light source 51b are smaller than those in the first light emission amount pattern. The first light emission amount pattern and the second light emission amount pattern may be equalized.

As described above, the light source control unit 50 performs the first control when the brightness of the place where the combiner 2 is placed is equal to or higher than the threshold value TH1. A case where the brightness detected by the brightness detection unit 57 is equal to or higher than the threshold value TH1 is a case where the luminance of the projected image is increased, for example, in daytime in order to improve visibility. In this case, even when the light emission amount of one light source is simply increased, the luminance of the projected image is not sufficiently increased since a maximum light emission amount of the single light source body has been determined. Further, if the light emission amount of one light source increases, a heat generation amount of the light source also increases. The light emission amount is also likely to decrease due to heat generation of the light source.

By performing the first control when the brightness detected by the brightness detection unit 57 is equal to or higher than the threshold value TH1, the light sources other than the light source that is emitting light emit light during the light emission period of each of the R light source 51r, the G light source 51g, and the B light source 51b. Therefore, it is possible to obtain a larger light emission amount than in a case where light is emitted by a single light source and to sufficiently increase the luminance of the projected image. Further, since the luminance of the projected image can be increased without increasing the number of light sources, it is possible to realize a small size and a low cost of the HUD.

Further, according to the HUD of FIG. 1, in the first control, a light emission amount of a light source that is caused to emit light at the same time as the respective light sources is set to be smaller than the respective light sources during the light emission period of each of the R light source 51r, the G light source 51g, and the B light source 51b. Therefore, it is possible to greatly suppress an increase in power consumption or a change in color of the projected image while improving the luminance of the projected image.

Further, according to the HUD of FIG. 1, the second control is performed in a case where the brightness of the place where the combiner 2 is placed is lower than the threshold value TH1. The case where the brightness of the place where the combiner 2 is placed is lower than the threshold value TH1 is, for example, a case of nighttime or a state equivalent to the nighttime (for example, a state in which the car 100 is in a tunnel), and luminance of the projected image is not so much required. Therefore, in this case, by performing the second control, it is possible to suppress power consumption in comparison with the first control while securing sufficient visibility.

The first control may be a control for causing any one of the light sources other than the light source that is emitting light to emit light at the same time during the light emission period of each of the R light source 51r, the G light source 51g, and the B light source 51b according to the first light emission amount pattern. Thus, it is possible to improve the luminance of the projected image. Further, by doing so, it is possible to suppress a change in the color of the projected image when the first control is performed.

Further, in the first control, the number of other light sources that are caused to emit light during the light emission period of each of the R light source 51r, the G light source 51g, and the B light source 51b according to the first light emission amount pattern may be variable. For example, the light source control unit 50 may increase the number of the other light sources that are caused to simultaneously emit light during the light emission period of an arbitrary light source according to the first light emission amount pattern as the brightness detected by the brightness detection unit 57 increases.

Thus, the brighter the place where the combiner 2 is placed, the higher the luminance of the projected image. Thus, it is possible to improve visibility. Further, when the place where the combiner 2 is placed is not so bright, the number of light sources that are caused to emit light can be decreased to reduce power consumption, and a change in color can be suppressed.

Further, although the other light sources are caused to emit light during the light emission period of each of the R light source 51r, the G light source 51g, and the B light source 51b in the example of FIG. 4, at least one of the light sources other than only a specific light source that is any one of the R light source 51r, the G light source 51g, and the B light source 51b may be set to a smaller light emission amount than the light emission amount of the specific light source and be cause to emit light during a light emission period of the specific light source according to the first light emission amount pattern.

Light emitting elements that are used as the R light source 51r, the G light source 51g, and the B light source 51b include a light emitting element of which light emission intensity greatly decreases with temperature rise. For example, when an LED is used as the light emitting element, a change in light emission intensity (a degree of decrease in light emission intensity) with respect to a temperature change (temperature rise) in the R light source 51r is greatest among the three light sources included in the display unit 5.

Therefore, according to a use environment of the HUD, particularly, the light emission amount cannot be sufficiently secured for the R light source 51r in which a change in light emission intensity with respect to a temperature change is maximized. Therefore, it is preferable for the above specific light source to be the R light source 51r. By doing this, for example, even in a situation where outside temperature is very high and the light emission amount of the R light source 51r cannot be sufficiently secured, it is possible to prevent the luminance of the projected image from being degraded due to the light emission amounts of the other light sources. Further, it is possible to prevent an increase in power consumption by causing the other light sources to emit light simultaneously only with respect to the specific light source.

A car is in an environment in which ambient brightness or temperature are likely to change. Therefore, the HUD illustrated in FIG. 1 is particularly effective when the HUD is incorporated and used in the car 100. Of course, the HUD illustrated in FIG. 1 can also be used for applications other than for a car.

The configuration in which the light source control unit 50 selectively performs the first control and the second control according to whether or not the brightness of the place where the combiner 2 is placed is equal to or higher than the threshold value TH1 has been described above. The light source control unit 50 may selectively perform the first control and the second control according to the temperature inside the display unit 5.

Figure 6:
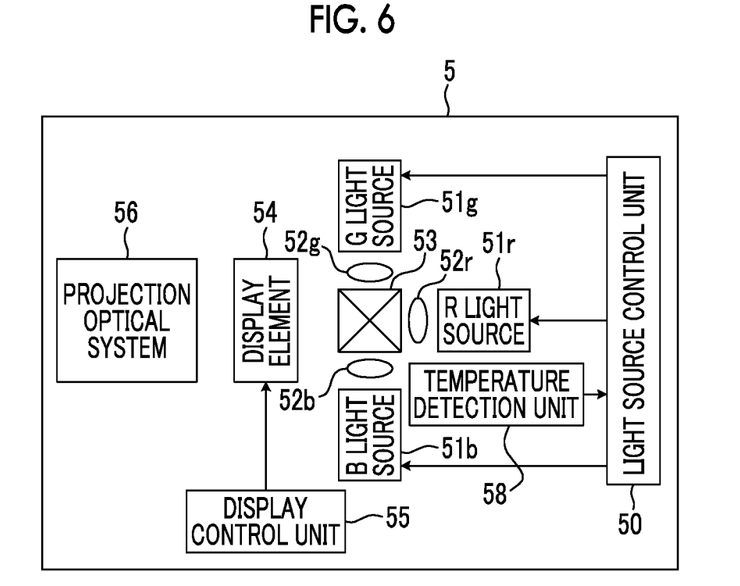
FIG. 6 is a diagram illustrating a modification example of a display unit illustrated in FIG. 1.

FIG. 6 is a diagram illustrating a modification example of the display unit 5 illustrated in FIG. 2. The display unit 5 illustrated in FIG. 6 has the same configuration as the display unit 5 illustrated in FIG. 2 except that a temperature detection unit 58 is included in place of the brightness detection unit 57.

The temperature detection unit 58 detects temperature inside the display unit 5 (specifically, temperature of the vicinity of an R light source 51r, a G light source 51g, and a B light source 51b), and notifies the light source control unit 50 of the detected temperature. The temperature detection unit 58 includes a temperature sensor such as a thermistor or a thermocouple.

The light source control unit 50 performs the first control in a case where the temperature inside the display unit 5 notified from the temperature detection unit 58 is equal to or higher than a threshold value TH2, and performs the second control in a case where the temperature inside the display unit 5 notified from the temperature detection unit 58 is lower than the threshold value TH2.

Figure 7:
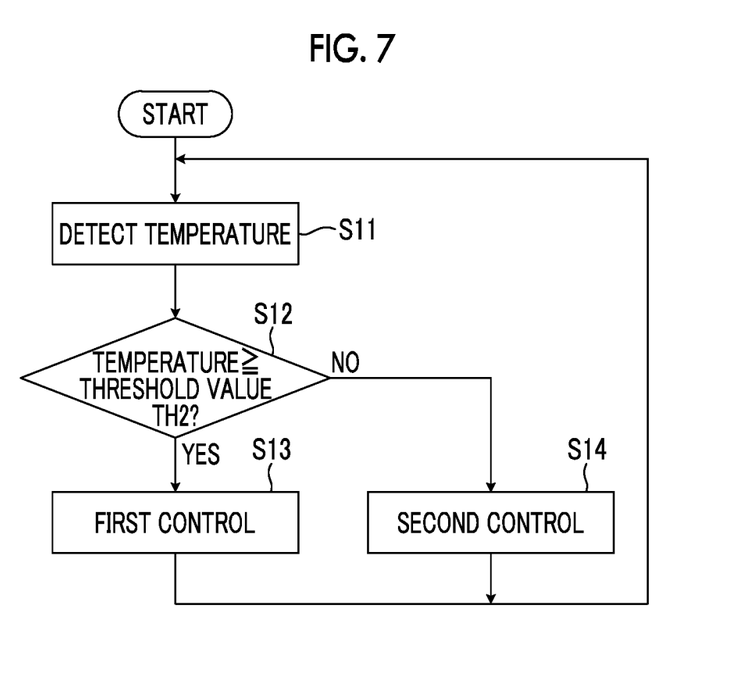
FIG. 7 is a flowchart illustrating an operation of the display unit illustrated in FIG. 6.

FIG. 7 is a flowchart illustrating an operation of the display unit 5 in FIG. 6. A process illustrated in FIG. 7 is repeatedly executed while power of the HUD is turned on.

The temperature detection unit 58 of the display unit 5 detects the temperature inside the display unit 5 and notifies the light source control unit 50 of the temperature (step S11). The light source control unit 50 determines whether or not the temperature notified from the temperature detection unit 58 is equal to or higher than the threshold value TH2 (step S12).

In a case where the light source control unit 50 determines that the temperature inside the display unit 5 is equal to or higher than the threshold value TH2 (step S12: YES), the light source control unit 50 performs the first control (step S13), and in a case where the temperature notified from the temperature detection unit 58 is lower than the threshold value TH2 (step S12: NO), the light source control unit 50 performs the second control (step S14).

As described above, the R light source 51r may have a higher degree of a decrease in light emission intensity with respect to temperature rise than the G light source 51g and the B light source 51b. In this case, if the temperature detected by the temperature detection unit 58 is equal to or higher than the threshold value TH2, luminance of a red portion in the projected image decreases. Further, the R light source 51r is often used for a display of important information.

Therefore, in a case where the temperature detected by the temperature detection unit 58 is equal to or higher than the threshold value TH2, the first control is performed to sufficiently increase luminance of important information to be notified to the driver 8 (for example, information for notifying that gasoline lacks, information for notifying that a pedestrian is near the car 100, information for notifying a traveling speed of the car 100, or the like). Thus, it is possible to improve visibility.

In the modification example of FIG. 6, the temperature detection unit 58 is used in place of the brightness detection unit 57, but the present invention is not limited thereto, and the brightness detection unit 57 and the temperature detection unit 58 can be used together. In this case, in a case where the brightness detection unit 57 detects that the brightness of the place where the combiner 2 is placed is equal to or higher than the threshold value TH1 or the temperature detection unit 58 detects that the temperature inside the display unit 5 is equal to or higher than the threshold value TH2, the light source control unit 50 may perform the first control.

Further, when a display of important information is required (for example, when gasoline lacks and a display of information for notifying the lack is required), the light source control unit 50 may perform switching from the second control to the first control regardless of the brightness of the combiner 2 or the temperature of the light source at that timing.

It should be considered that the disclosed embodiments are illustrative and are not restrictive in all respects. The scope of the present invention is intended to be defined not by the above description but by the claims and to include all changes within meanings and a scope equivalent to the claims.

The following matters are disclosed in this specification, as described above.

The disclosed projection display device includes a plurality of light sources that emit light beams with different colors, a projection unit that projects light according to image information among the light beams emitted from the plurality of light sources onto a projection surface, and a light source control unit that sets a light emission amount of each of the plurality of light sources to a predetermined light emission amount pattern, and sequentially emits lights from the plurality of light sources according to the light emission amount pattern, and the light source control unit performs first control for causing at least one of the light sources other than a specific light source among the plurality of light sources to emit light with a smaller light emission amount than a light emission amount of the specific light source during a light emission period of the specific light source according to the light emission amount pattern, the specific light source being any one of the plurality of light sources.

The disclosed projection display device further includes a brightness detection unit that detects brightness of a place at which the projection surface is placed, and the light source control unit selectively performs second control for causing the plurality of respective light sources to sequentially emit light and the first control, performs the first control in a case where the brightness detected by the brightness detection unit is equal to or higher than a threshold value, and performs the second control in a case where the brightness detected by the brightness detection unit is lower than the threshold value.

In the disclosed projection display device, the specific light source includes a light source in which a change in light emission intensity with respect to a change in temperature is maximized among the plurality of light sources.

The disclosed projection display device further includes a temperature detection unit that detects temperature, and the specific light source is a light source in which a change in light emission intensity with respect to a temperature change is maximized among the plurality of light sources, and the light source control unit selectively performs the first control, and second control for causing the plurality of respective light sources to sequentially emit light, performs the first control in a case where the temperature detected by the temperature detection unit is equal to or higher than a threshold value, and performs the second control in a case where the temperature detected by the temperature detection unit is lower than the threshold value.

In the disclosed projection display device, the plurality of light sources include a red light source that emits red light, a green light source that emits green light, and a blue light source that emits blue light, and the light source in which a change in light emission intensity with respect to a temperature change is maximized is the red light source.

The disclosed projection display device is incorporated and used in a car.

The disclosed light source control method is a light source control method of a projection display device including a plurality of light sources that emit light beams with different colors, and a projection unit that projects light according to image information among the light beams emitted from the plurality of light sources onto a projection surface, the light source control method including: a light source control step of setting a light emission amount of each of the plurality of light sources to a predetermined light emission amount pattern, and sequentially emitting lights from the plurality of light sources according to the light emission amount pattern, in which the light source control step includes performing first control for causing at least one of the light sources other than a specific light source among the plurality of light sources to emit light with a smaller light emission amount than a light emission amount of the specific light source during a light emission period of the specific light source according to the light emission amount pattern, the specific light source being any one of the plurality of light sources.

The disclosed light source control method further includes a brightness detection step of detecting brightness of a place at which the projection surface is placed, and the light source control step includes selectively performing second control for causing the plurality of respective light sources to sequentially emit light and the first control, performing the first control in a case where the brightness detected in the brightness detection step is equal to or higher than a threshold value, and performing the second control in a case where the brightness detected in the brightness detection step is lower than the threshold value.

In the disclosed light source control method, the specific light source is a light source in which a change in light emission intensity with respect to a temperature change is maximized among the plurality of light sources.

The disclosed light source control method further includes a temperature detection step of detecting temperature, the specific light source is a light source in which a change in light emission intensity with respect to a temperature change is maximized among the plurality of light sources, and the light source control step includes selectively performing the first control, and second control for causing the plurality of respective light sources to sequentially emit light, performing the first control in a case where the temperature detected in the temperature detection step is equal to or higher than a threshold value, and performing the second control in a case where the temperature detected in the temperature detection step is lower than the threshold value.

In the disclosed light source control method, the plurality of light sources include a red light source that emits red light, a green light source that emits green light, and a blue light source that emits blue light, and the light source in which a change in light emission intensity with respect to a temperature change is maximized is the red light source.

The present invention is particularly applied to an HUD for a vehicle, and is highly convenient and effective.

EXPLANATION OF REFERENCES

2: combiner
6: mirror
50: light source control unit
51r: R light source
51g: G light source
51b: B light source
56: projection optical system

What is claimed is:

1. A projection display device, comprising:
a plurality of light sources that emit light beams with different colors;
a projector, projecting light according to image information among the light beams emitted from the plurality of light sources onto a projection surface;
a light source controller, setting a light emission amount of each of the plurality of light sources to a predetermined light emission amount pattern, and sequentially emitting lights from the plurality of light sources according to the light emission amount pattern, wherein when only a specific light source among the plurality of the light sources is set with the light emission amount, the projector projects light with a specific color emitted by the specific light source; and
a temperature sensor, detecting temperature,
wherein the light source controller performs first control for causing at least one of the light sources other than the specific light source among the plurality of light sources to simultaneously emit light with the specific light source during one light emission period for emitting the specific color of the specific light source,
wherein, in the first control, the at least one of the light sources is set with a smaller light emission amount than the light emission amount of the specific light source during the light emission period for emitting the specific color of the specific light source according to the light emission amount pattern, wherein the specific light source being any one of the plurality of light sources;
wherein the specific light source is a light source in which a change in light emission intensity with respect to a temperature change is maximized among the plurality of light sources; and
wherein the light source controller selectively performs the first control, and second control for causing the plurality of respective light sources to sequentially emit light, performs the first control in a case where the temperature detected by the temperature sensor is equal to or higher than a threshold value, and performs the second control in a case where the temperature detected by the temperature sensor is lower than the threshold value.

2. The projection display device according to claim 1, wherein the plurality of light sources include a red light source that emits red light, a green light source that emits green light, and a blue light source that emits blue light, and the light source in which a change in light emission intensity with respect to a temperature change is maximized is the red light source.

3. The projection display device according to claim 2, wherein the projection display device is incorporated and used in a car.

4. The projection display device according to claim 1, wherein the projection display device is incorporated and used in a car.

5. The projection display device according to claim 1, wherein the light source controller performs the first control for causing at least one of the light sources other than the specific light source among the plurality of light sources to emit light simultaneously with the specific light source with the smaller light emission amount than the light emission amount of the specific light source during the light emission period of the specific light source according to the light emission amount pattern.

6. The projection display device according to claim 1, wherein the light source controller does not control signal amplitude of the image information.

7. The projection display device according to claim 1, wherein the light source controller performs the first control for causing at least one of the light sources other than the specific light source among the plurality of light sources to emit light only with respect to the specific light source.

8. The projection display device according to claim 1, wherein the light source controller selectively performs the first control and the second control under an environment in which use power is limited.

9. A light source control method of a projection display device including a plurality of light sources that emit light beams with different colors, and a projector that projects light according to image information among the light beams emitted from the plurality of light sources onto a projection surface, the light source control method comprising:

a light source control step of setting a light emission amount of each of the plurality of light sources to a predetermined light emission amount pattern, and sequentially emitting lights from the plurality of light sources according to the light emission amount pattern, wherein when only a specific light source among the plurality of the light sources is set with the light emission amount, the projector projects light with a specific color emitted by the specific light source; and a temperature detection step of detecting temperature, wherein the light source control step includes performing first control for causing at least one of the light sources other than the specific light source among the plurality of light sources to simultaneously emit light with the specific light source during one light emission period for emitting the specific color of the specific light source, wherein, in the first control, the at least one of the light sources is set with a smaller light emission amount than the light emission amount of the specific light source during the light emission period for emitting the specific color of the specific light source according to the light emission amount pattern, wherein the specific light source being any one of the plurality of light sources;

wherein the specific light source is a light source in which a change in light emission intensity with respect to a temperature change is maximized among the plurality of light sources; and wherein the light source control step includes selectively performing the first control, and second control for causing the plurality of respective light sources to sequentially emit light, performing the first control in a case where the temperature detected in the temperature detection step is equal to or higher than a threshold value, and performing the second control in a case where the temperature detected in the temperature detection step is lower than the threshold value.

10. The light source control method according to claim 9, wherein the plurality of light sources include a red light source that emits red light, a green light source that emits green light, and a blue light source that emits blue light, and the light source in which a change in light emission intensity with respect to a temperature change is maximized is the red light source.

11. The light source control method according to claim 9, wherein the light source control step includes performing the first control for causing at least one of the light sources other than the specific light source among the plurality of light sources to emit light simultaneously with the specific light source with the smaller light emission amount than the light emission amount of the specific light source during the light emission period of the specific light source according to the light emission amount pattern.

12. The light source control method according to claim 9, wherein the light source control step does not include controlling signal amplitude of the image information.

13. The light source control method according to claim 9, wherein the light source control step includes performing the first control for causing at least one of the light sources other than the specific light source among the plurality of light sources to emit light only with respect to the specific light source.

14. The light source control method according to claim 9, wherein the light source control step includes selectively performing the first control and the second control under an environment in which use power is limited.

* * * * *